Oct. 11, 1955 R. R. WEBB ET AL 2,720,263

CARD NOTCHING MACHINE

Filed Feb. 15, 1951 4 Sheets-Sheet 1

INVENTORS
ROBERT R. WEBB
CARL J. NARDON
BY
Lyon & Lyon
ATTORNEYS

Oct. 11, 1955 R. R. WEBB ET AL 2,720,263

CARD NOTCHING MACHINE

Filed Feb. 15, 1951 4 Sheets-Sheet 2

INVENTORS
ROBERT R. WEBB
CARL J. HARDON
BY
Lyon & Lyon
ATTORNEYS

Oct. 11, 1955 R. R. WEBB ET AL 2,720,263

CARD NOTCHING MACHINE

Filed Feb. 15, 1951 4 Sheets-Sheet 3

INVENTORS
ROBERT R. WEBB
CARL J. NARDON
BY Lyon & Lyon
ATTORNEYS

CARD NOTCHING MACHINE
Filed Feb. 15, 1951 4 Sheets-Sheet 4
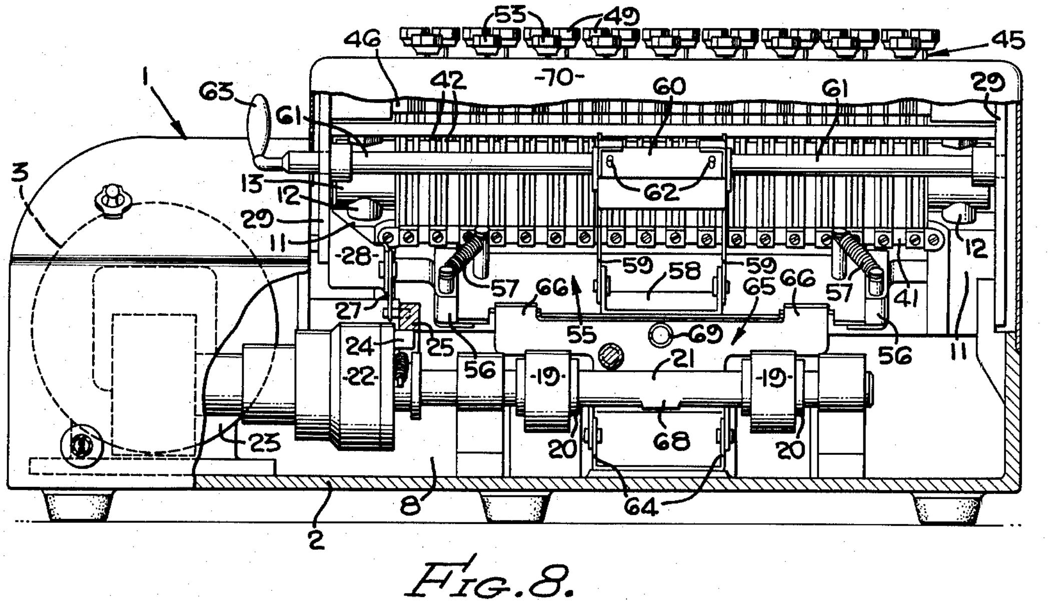
FIG. 8.
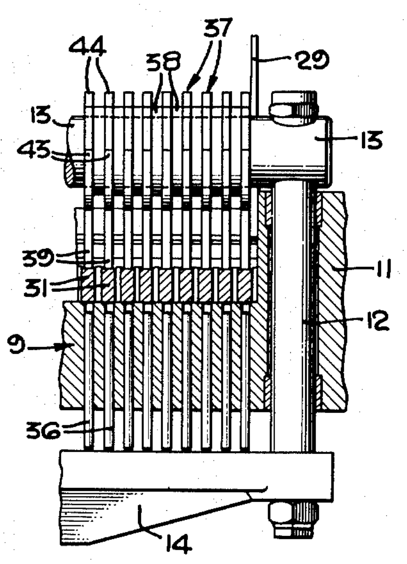
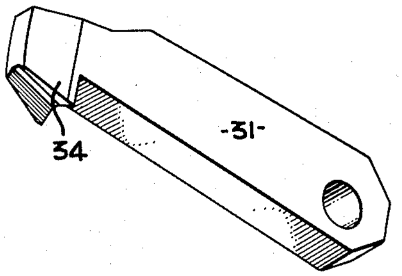
FIG. 10.
FIG. 9.
INVENTORS
ROBERT R. WEBB
CARL J. NARDOH
BY Lyon & Lyon
ATTORNEYS

United States Patent Office 2,720,263

Patented Oct. 11, 1955

2,720,263

CARD NOTCHING MACHINE

Robert R. Webb, Rosemead, and Carl James Nardon, Los Angeles, Calif., assignors to Charles R. Hadley Company, Los Angeles, Calif., a corporation of California Application February 15, 1951, Serial No. 211,094

13 Claims. (Cl. 164—112)

This invention relates to card notching machines, that is, to machines for notching the margins of cards, such as used in various record systems, utilizing preselected arrangements of notches in the card margins for the purpose of sorting or grouping cards. Such record cards have along one or more margins a series of fields, usually providing space for four holes, representing the numbers 7, 4, 2 and 1. By notching the margin of a card opposite one or more holes in each field, any number from one through 9 may be selected. Then by use of pins, inserted through a stack of cards, those of any desired group may be located and separated. Such record cards are in widespread use and require machines capable of ready manipulation for notching margins in any desired pattern. Accordingly then, included in the objects of this invention are:

First, to provide a card notching machine wherein an entire margin of a card, or any portion thereof, may be notched or punched by depressing appropriate buttons and then operating a single lever to cause selected punches to notch the card.

Second, to provide a card notching machine wherein the individual card punching members may be preselected or readily and quickly cleared and rendered inoperative in case of a mistake or if a change is made before performing the punching operation.

Third, to provide in a card notching machine a particularly dependable and efficient selecting means for the card punching members, involving relatively inexpensive parts which are readily fabricated and assembled.

Fourth, to provide in a card notching machine a novel means whereby the punch members may be automatically cleared and rendered inoperative after each punch stroke, or caused to remain operative for repeated operation or be manually cleared, if desired.

Fifth, to provide in a card notching machine a novel means whereby selected groups of punches may be cleared without disturbing other punches.

Sixth, to provide in a card notching machine a compact and rugged punch operating mechanism.

With the above and other objects in view as may appear hereinafter, reference is directed to the accompanying drawings in which:

Figure 8 is a fragmentary longitudinal sectional view through 8—8 of Figure 3, showing the drive mechanism.

Figure 9 is a fragmentary sectional view through 9—9 of Figure 4.

Figure 10 is a perspective view of one of the punch members.

Figures 1, 2:
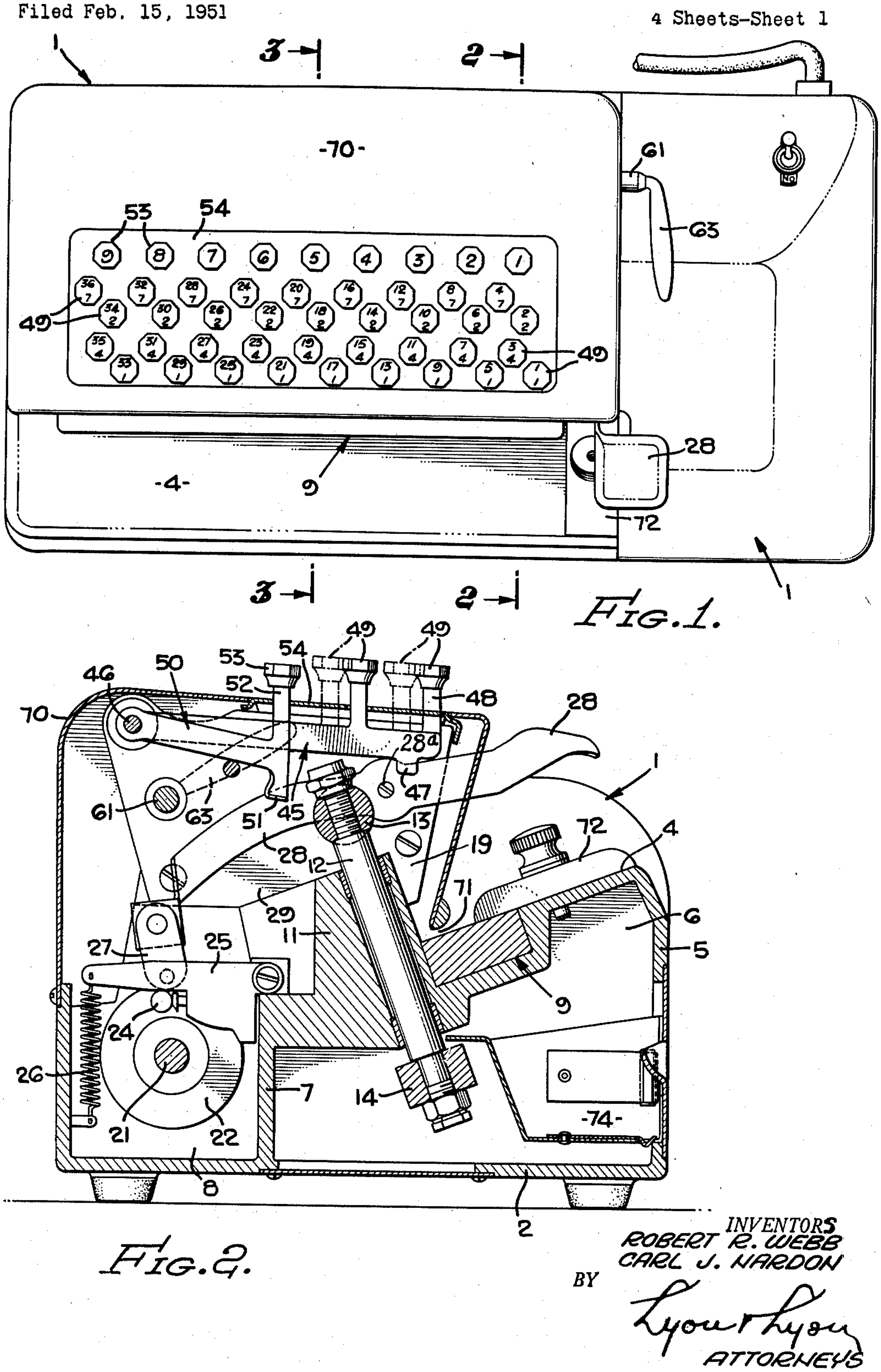
Figure 1 is a top or plan view of the card notching machine.
Figure 2 is a transverse sectional view through 2—2 of Figure 1, showing the parts of the machine in their normal or initial condition.

The card notching machine includes a housing 1 which is rectangular in plan and includes a flat base 2. At one end is a motor compartment 3. Extending from the motor compartment and occupying the remaining length of the housing at its front portion, is a downwardly and rearwardly sloping deck 4 spaced from the base 2 to form a forward compartment 6. The rear margin of the deck is supported by a partition 7 which separates the forward compartment 6 from a rear or drive shaft compartment 8.

Set in the sloping deck 4 is a die block 9 having a row of die openings 10. At the extremities of the die openings, the upper deck of the housing 1 is provided with bosses 11, having downwardly and forwardly directed bores disposed at right angles to the face of the die block and adapted to receive connecting rods 12. The upper extremities of the connecting rods are joined by a horizontal selector shaft 13 adapted to receive punch selectors to be described hereinafter. The lower extremities of the connecting rods 12 project into the forward compartment 6, and are connected by a cross frame or beam 14.

The underside of the deck 4 is provided with a pair of spaced depending bearing lugs 18, each of which supports the upper end of a toggle link 17. A lower toggle link 16 is pivotally connected to each upper toggle link and is also pivotally connected to a boss 15, extended rearwardly from the beam 14. The adjacent ends of the toggle links 16 and 17 are connected to thrust arms 19, there being a pair of such thrust arms. The thrust arms extend rearwardly through slots in the partition 7 and are journaled on eccentrics 20 mounted on a drive shaft 21 extended longitudinally in the rear compartment 8.

The drive shaft 21 is connected through a suitable clutch 22 to a motor unit 23 contained in the motor compartment 3. The clutch may be of the type which includes a clutch pin 24, adapted to be engaged by a stop lever 25. The stop lever is normally held by a spring 26 in position to engage the clutch pin and prevent rotation of the drive shaft 21. The stop lever is connected by a link 27 to a hand lever 28 positioned for convenient engagement so that the stop lever can be raised to permit rotation of the drive shaft 21. The hand lever may be pivoted intermediate its ends on a journal pin **28*a* extending inwardly from an end plate 29. An end plate 29 is provided at each extremity of the selector shaft 13 and may be formed integral with or secured to the bosses 11 which guide the connecting rods 12**.

Mounted between and rearwardly of the bosses 11 and resting on the rear portion of the die block 9 is a punch frame 30 which receives a plurality of punch levers 31 arranged in a row. The punch levers are separated by spacer webs 32 forming a part of the punch frame. A common journal rod 33 extends through the spacer webs and punch levers. The punch levers extend forwardly from their pivoted ends and are provided with punch tips 34 which cooperate with the die openings 10 provided in the die block. For the purpose of notching the edges of cards, each punch forms a notch in the form of a truncated V.

The punch levers are actuated by means to be described hereinafter. Return movement of the punch levers is effected by pins 36, located in the plane defined by the selector shaft 13 and cross bar of beam 14. The pins slide in holes provided in the die block 9 and the underlying portion of the housing 1. The lower extremities of the pins 36 are engaged by the beam 14 and their upper extremities engage the punch levers to raise the same on upward movement of the beam 14.

Mounted on the selector shaft 13 is a series of punch selector members 37 separated by spacers 38. The selector members 37 correspond to the punch levers 31 and are provided with arms 39 movable into the plane defined by the selector shaft 13 and beam 14 for the purpose of engaging and depressing the corresponding punch levers upon downward movement of the selector shaft.

Each of the selector members is capable of arcuate movement on the selector shaft and may be shifted forwardly against a stop 40 so that its arm 39 clears the corresponding punch lever to prevent operation thereof on reciprocation of the selector shaft. Each selector member is limited in its rearward movement by a bar 41 which carries a row of detent springs 42. The detent springs engage notches in the selector members to aid in holding these members in their forward inoperative positions or in their rearward operative positions.

Each selector member 37 is provided with an upwardly and forwardly directed setting lug 43 adapted to be engaged for the purpose of shifting the selector member from its inoperative to its operative position. In addition, each selector member is provided with a rearwardly directed clearing arm 44 positioned for engagement to shift the selector member from its operative to its inoperative position.

Mounted about the selector shaft 13 is a plurality of forwardly directed selector levers 45 mounted at their rearward extremities on a common journal rod 46 extending between the end plates 29. At their forward extremities, the selector levers are provided with depending bosses 47 which engage corresponding setting lugs 43. Each selector lever is provided with an upwardly directed arm 48 which carries a button 49. In order to provide close grouping of the selector levers, the arms 48 are staggered. Thus, as shown in Figures 1 and 2, four rows of buttons are provided.

Also mounted on the rod 46 is a series of clearing levers 50. Each clearing lever is provided with an arm 51 which extends downwardly and laterally to engage a group of selector members 37 by their rear arms 44. In the construction shown, one clearing lever 50 engages four selector members 37. Each clearing lever 50 is provided with an upwardly directed arm 52, having a button 53. The buttons 53 are arranged in a fifth row behind the buttons 49.

Secured to the end plates and extended therebetween, is a guard plate 54 provided with a plurality of apertures to receive and clear the button arms 48 and 52.

Slidably mounted between the punch frame 30 and the rear stop bar 41, is a master clearing plate 55 adapted to reciprocate and, on forward movement, to engage the arms 39 of the selector members 37 for the purpose of moving all of the selector members simultaneously from their operative positions to their inoperative positions. The master clearing plate moves between guide brackets 56 and is normally maintained in a rearward inoperative position by means of retracting springs 57.

The clearing plate 55 is provided with a bearing bracket 58 connected to a pair of levers 59 which are journaled on an eccentric 60 secured to a shaft 61 by cross pins 62, which also serve as stops to transmit arcuate movement of the shaft 61 to the levers 59. One end of the shaft 61 is provided with a hand lever 63. The eccentric 60 raises and lowers the rear end of the master clearing plate 55 whereas the cross pins 62 operate to produce a forward movement in opposition to the springs 57. This forward movement causes the entire group of selector members to clear the punch levers.

Mounted in the rear compartment 8 is a pair of bearing brackets 64 which journal the lower end of a shifting plate 65 which extends upwardly and is provided with tongues 66 at its upper extremity positioned to engage the rear edge of the master clearing plate 55 when the plate is in its lower position determined by the eccentrics 60. When the rear edge of the clearing plate 55 is in its upper position, the tongues 66 do not engage the clearing plate.

The shifting plate 65 is provided with a cam roller 67 which is held in yieldable engagement with a cam 68 on the drive shaft 21 by means of a spring 69. The cam 68 causes forward movement of the shifting plate 65 with each rotation of the drive shaft, thus, if the clearing plate is in its lower position, the shifting plate operates automatically to move all of the selector members to their inoperative position after a punching cycle has been completed.

The rear compartment shaft 61 and levers 45 and 50 are enclosed in a cover 70, the forward side of which defines with the top deck 4 and die block 9 a narrow slot 71, adapted to receive a card. At one end, preferably the end adjacent the motor compartment, the deck 4 is provided with an adjustable guide 72 to aid in positioning the cards to be punched.

The die block and underlying portion of the housing 1 is provided under the die openings 35 with relief or clearance openings 73 into which the punchings from the cards may fall. The forward compartment 6 is provided with a drawer 74 which collects the punchings.

Operation of the card notching machine is as follows: The machine is intended to punch cards having initially a series of perforations adjacent one or more margins. These perforations are arranged in groups of four, representing the digits 7, 4, 2 and 1. By selecting one or two of these perforations, any number from 1 through 9 may be selected.

Figure 3:
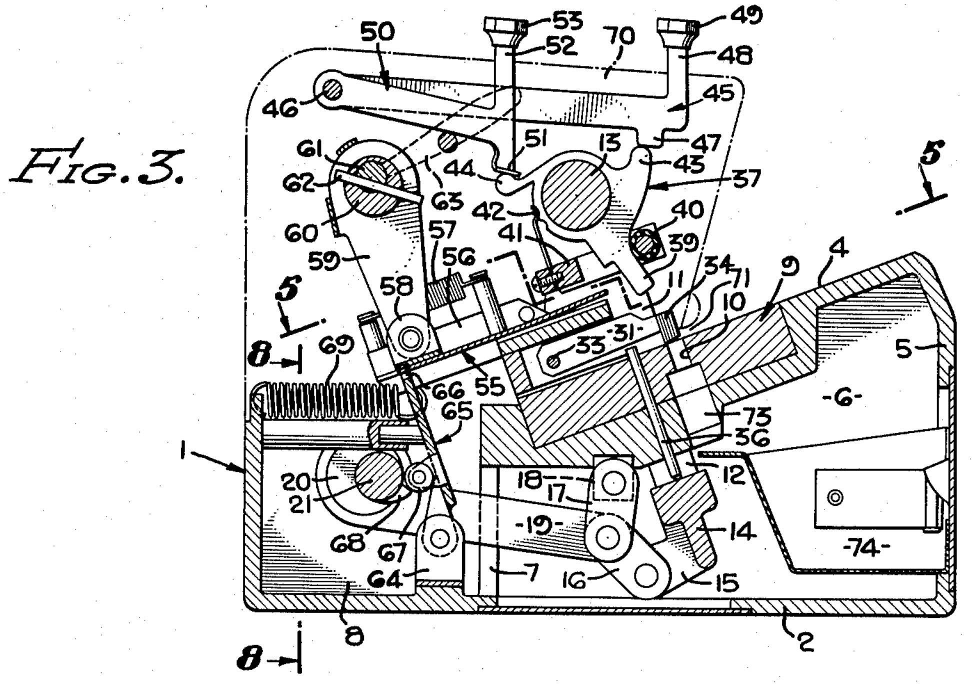
Figure 3 is a transverse sectional view through 3—3 of Figure 1, also showing the parts of the machine in their initial or normal position.

Thus each group of four perforations may represent a digital unit, such as tens, hundreds, thousands, etc. The punches are spaced to correspond to the initial perforations in the card and are thus arranged in groups of four with their corresponding buttons labeled 7, 4, 2 or 1. When desiring to notch a card to represent any number within the capacity of the machine, the appropriate buttons 49 are depressed, moving the corresponding selector members from their normally inoperative position shown in Figure 3 to their operative position shown in Figure 4. Upon the pressing of the hand lever 28, the drive shaft 21 is rotated through one cycle of operation, causing the selector shaft to reciprocate all of the selector members. Thus members in their operative positions depress the corresponding punches to effect a corresponding notching of the card. Return movement of the selector shaft and the beam to which it is connected, causes the return pins 36 to raise the punch levers clear of the card.

Figures 4, 4A:
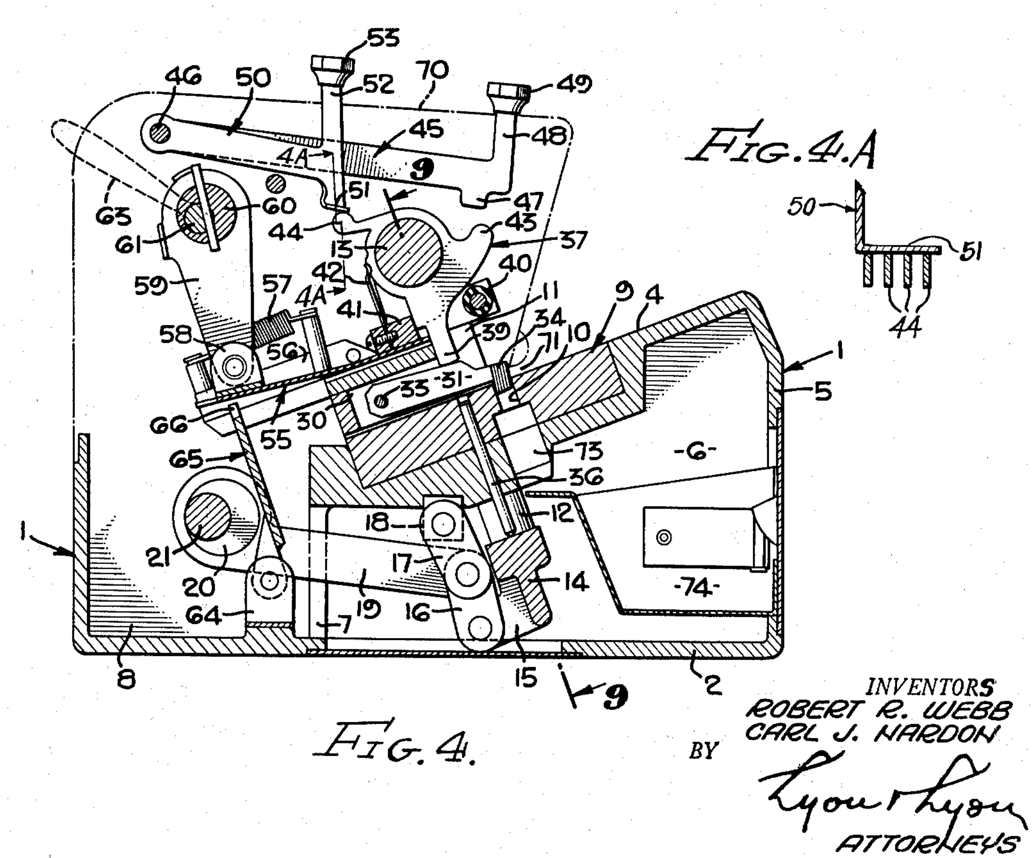
Figure 4 is a sectional view in the same plane as Figure 3, but showing the parts as they appear upon completion of the punching stroke.
Figure 4A is a fragmentary sectional view through 4A—4A of Figure 4, showing a clearing lever and the arms of the corresponding selector members engaged thereby.
Figure 5:
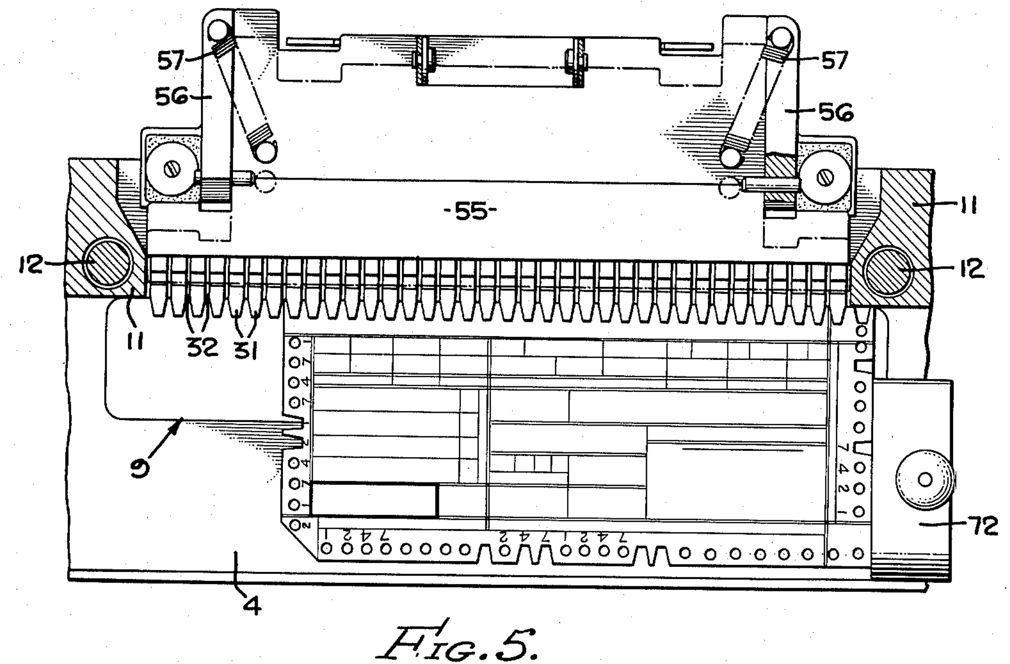
Figure 5 is a fragmentary sectional view through 5—5 of Figure 3 with portions of the mechanism omitted to facilitate the illustration.
Figures 6, 7:
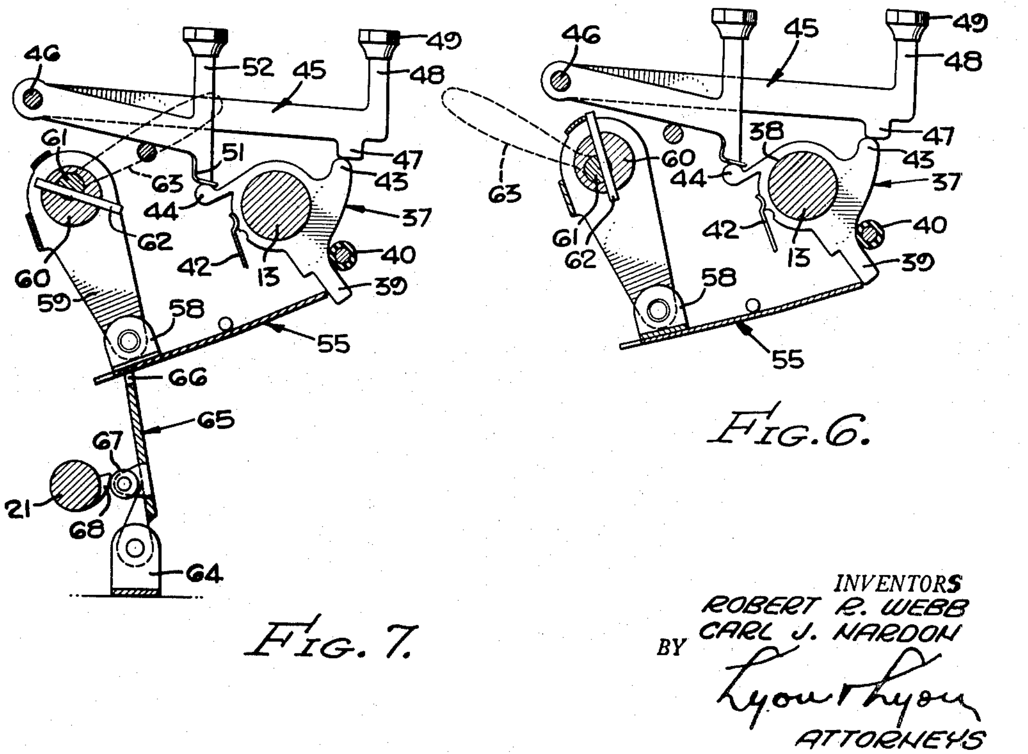
Figure 6 is a fragmentary transverse sectional view in the same plane as Figure 4, showing portions of the machine as they appear, when manually shifting the punch selector members to their cleared or inoperative positions.
Figure 7 is a fragmentary sectional view, similar to Figure 6 but showing the parts when positioned for automatic clearing of the punch selector members.

If the hand lever 63 is in the position shown in Figure 4, the chosen selector members remain in position and the same numeral may be indicated in successive cards. If the hand lever 63 is in the position shown in Figure 3 or Figure 7, the shifting plate 65 engages the clearing plate 55, returning the chosen selector members to their inoperative position on completion of a punching cycle. As shown in Figure 6, the hand levers 63 may be operated manually to effect clearance of all the selector members and the clearing plate 55 may be returned by the spring 57.

If it is desired to clear a single group of four punches, the appropriate clearing lever 50 is operated. Thus in punching a series of cards where the last digit is to be changed, the hand lever 63 may be in its repeat position, shown in Figure 4, and only the clearing lever representing the last digit is operated.

It will be observed that the return pins 36 serve to hold the punch levers clear of the die openings and that this support is withdrawn during the punching cycle, however, only those punches engaged by the selector members function. While springs could be employed to maintain the unused punches in their raised position, it has been found that the accumulative force of a large number of springs rather substantially increases the power required for operation.

While the machine is primarily intended for the "7, 4, 2, 1" digital numbering system, the keys 49 are also marked in numerical order from 1 to 36 so that a direct sort is possible within the range of the thirty-six keys of the machine.

Having fully described our invention, it is to be understood that we do not wish to be limited to the details herein set forth, but our invention is of the full scope of the appended claims.

We claim:

1. A card notching machine, involving: a gang punch and die including a plurality of individually pivotal punch levers sharing a common axis and having forwardly extending operating ends; an actuator including a drive means, a laterally reciprocable actuator bar disposed above the extended forward ends of said punch levers and movable to and from said punch levers, and a plurality of selector members carried by said actuator bar and having depending arms, said selector members being individually pivotal about the axis of said actuator bar between operating positions wherein said depending arms are substantially normal to and engage corresponding punch levers on reciprocation of said actuator bar, and inoperative angular positions wherein they clear their respective punch levers; and a keyboard disposed above said selector members and including a plurality of manually operated setting levers pivoted rearwardly of and projecting forwardly of said actuator bar and selector members thereon, said setting levers and selector members having cooperating means for individually pivoting said selector members to their operative positions, and a plurality of manually operated clearing levers pivoted coaxially with said setting levers and terminating rearwardly of said actuator bar and selector members, said clearing levers and said selector members having cooperating means to pivot groups of said selector members to their inoperative positions.

2. A card notching machine, involving: a gang punch and die including a plurality of individually pivotal punch levers sharing a common axis and having forwardly extending operating ends; an actuator including a drive means, a laterally reciprocable actuator bar disposed above the extended forward ends of said punch levers and movable to and from said punch levers, and a plurality of selector members carried by said actuator bar and having depending arms, said selector members being individually pivotal about the axis of said actuator bar between operating positions wherein said depending arms are substantially normal to and engage corresponding punch levers on reciprocation of said actuator bar, and inoperative angular positions wherein they clear their respective punch levers; a keyboard disposed above said selector members and including a plurality of manually operated setting levers pivoted rearwardly of and projecting forwardly of said actuator bar and selector members thereon, said setting levers and selector members having cooperating means for individually pivoting said selector members to their operative positions, and a plurality of manually operated clearing levers pivoted coaxially with said setting levers and terminating rearwardly of said actuator bar and selector members, said clearing levers and said selector members having cooperating means to pivot groups of said selector members to their inoperative positions; and a master clearing mechanism including a blade located behind the depending arms of said selector members and simultaneously engageable with all of said arms to pivot all of said selector members to their inoperative positions.

3. A card notching machine, involving: a gang punch and die including a plurality of individually pivotal punch levers sharing a common axis and having forwardly extending operating ends; an actuator including a drive means, a laterally reciprocable actuator bar disposed above the extended forward ends of said punch levers and movable to and from said punch levers, and a plurality of selector members carried by said actuator bar and having depending arms, said selector members being individually pivotal about the axis of said actuator bar between operating positions wherein said depending arms are substantially normal to and engage corresponding punch levers on reciprocation of said actuator bar, and inoperative angular positions wherein they clear their respective punch levers; a keyboard disposed above said selector members and including a plurality of manually operated setting levers pivoted rearwardly of and projecting forwardly of said actuator bar and selector members thereon, said setting levers and selector members having cooperating means for individually pivoting said selector members to their operative positions, and a plurality of manually operated clearing levers pivoted coaxially with said setting levers and terminating rearwardly of said actuator bar and selector members, said clearing levers and said selector members having cooperating means to pivot groups of said selector members to their inoperative positions; a master clearing mechanism including a blade located behind the depending arms of said selector members and simultaneously engageable with all of said arms to pivot all of said selector members to their inoperative positions; and automatic operating means for said master clearing blade connected with said actuator bar, and manually operating means to disconnect said clearing blade from said automatic operating means.

4. A card notching machine, involving: a die block; a row of individual punch members cooperating with said die block; a reciprocable frame including upper and lower cross bars disposed respectively above said punch members and below said die blocks and defining a plane passing adjacent the operating ends of said punch members; selector members carried by said upper bar and individually pivotable about the axis of the upper bar into said plane defined by said bars for operative engagement with a corresponding punch member, and pivotable into an angular position out of said plane to clear said corresponding punch members; return pins disposed between said lower bar and punch members to raise said punch members after operative engagement therewith by said selector members; and a keyboard including a plurality of manually operated setting levers for shifting said selector members to their operative positions, and a plurality of clearing levers manually engageable to shift groups of said selector members to their inoperative positions.

5. A card notching machine, involving: a die block; a row of individual punch members cooperating with said die block; a reciprocable frame including upper and lower cross bars disposed respectively above said punch members and below said die block and defining a plane passing adjacent the operating ends of said punch members; selector members carried by said upper bar and individually pivotal about the axis of said upper bar into said plane defined by said bars for operative engagement with a corresponding punch member, and pivotable into an angular position out of said plane to clear said corresponding punch members; return pins disposed between said lower bar and punch members to raise said punch members after operative engagement therewith by said selector members; a keyboard including a plurality of manually operated setting levers for shifting said selector members to their operative positions, and a plurality of clearing levers manually engageable to shift groups of said selector members to their inoperative positions; and a master clearing mechanism including a member engageable with all said selector members to shift said selector members to their inoperative positions.

6. A card notching machine, involving: a die block; a row of individual punch members cooperating with said die blocks; a reciprocable frame including upper and lower cross bars disposed respectively above said punch members and below said die block; selector members carried by said upper bar and individually movable into a plane defined by said bars for operative engagement with a corresponding punch member, and movable into an angular position to clear said corresponding punch members; return pins disposed between said lower bar and punch members to raise said punch members after operative engagement therewith by said selector members; a keyboard including a plurality of manually operated setting levers for shifting said selector members to their operative positions, a plurality of clearing levers manually engageable to shift groups of said selector members to their inoperative positions, and operating means for said reciprocable frame; and a master clearing mechanism including a clearing member engageable with all said selector members to shift said selector members to their inoperative positions, a device actuated by said operating means to effect automatic movement of said clearing member after each operation of said punch members, and a manual means to render said device inoperative and to effect manual operation of said clearing member.

7. A card notching machine, involving: a die block; a row of individual punch members cooperating with said die block; a reciprocable frame including upper and lower cross bars disposed respectively above said punch members and below said die block; selector members carried by said upper bar and individually movable into a plane defined by said bars for operative engagement with a corresponding punch member, and movable into an angular position to clear said corresponding punch members; return pins disposed between said lower bar and punch members to raise said punch members after operative engagement therewith by said selector members; an operating means for said reciprocable frame; and a master clearing mechanism including a clearing member engageable with all said selector members to shift said selector members to their inoperative positions, a device actuated by said operating means to effect automatic movement of said clearing member after each operation of said punch members, and a manual means to render said device inoperative and to effect manual operation of said clearing member.

8. A card notching machine, involving: a die block; a row of individual punch members cooperating with said die block; a reciprocable frame including substantially coplanar upper and lower cross bars disposed respectively above said punch members and below said die block; selector members mounted on said upper bar, each selector member being oscillatable about the axis of said upper bar and including a first arm movable between an operative position in the plane of said cross bars for engagement with a corresponding punch member and an inoperative angular position clearing said punch member, a second arm positioned for engagement to shift said first arm from said inoperative position to said operative position, and a third arm positioned for engagement to shift said first arm from its operative to its inoperative position; and a keyboard including a plurality of manually operated setting levers engageable with corresponding second arms, and a plurality of manually operated clearing levers engageable with preselected groups of said third arms.

9. A card notching machine, involving: a die block; a row of individual punch members cooperating with said die block; a reciprocable frame including substantially coplanar upper and lower cross bars disposed respectively above said punch members and below said die block; selector members mounted on said upper bar, each selector member being oscillatable about the axis of said upper bar and including a first arm movable between an operative position in the plane of said cross bars for engagement with a corresponding punch member and an inoperative angular position clearing said punch member, a second arm positioned for engagement to shift said first arm from said inoperative position to said operative position, and a third arm positioned for engagement to shift said first arm from its operative to its inoperative position; a keyboard including a plurality of manually operated setting levers engageable with corresponding second arms, and a plurality of manually operated clearing levers engageable with preselected groups of said third arms; and a master clearing member operable to shift all of said selector members to render said first arms inoperative.

10. A card notching machine, involving: a die block; a row of individual punch members cooperating with said die block; a reciprocable frame including substantially coplanar upper and lower cross bars disposed respectively above said punch members and below said die block; selector members mounted on said upper bar, each selector member being oscillatable about the axis of said upper bar and including a first arm movable between an operative position in the plane of said cross bars for engagement with a corresponding punch member and an inoperative angular position clearing said punch member, a second arm positioned for engagement to shift said first arm from said inoperative position to said operative position, and a third arm positioned for engagement to shift said first arm from its operative to its inoperative position; a keyboard including a plurality of manually operated setting levers engageable with corresponding second arms, and a plurality of manually operated clearing levers engageable with said third arms; a master clearing member operable to shift all of said selector members to render said first arms inoperative; an actuating means for said reciprocable frame; a device for operatively connecting said actuating means with said master clearing member to effect automatic clearing of said selector member; and manually operable means to render said device inoperative on said master clearing member.

11. A card notching machine, involving: a die block; a row of individually and freely movable punch members tending to fit into corresponding die apertures in said die block; a reciprocable frame including an upper cross bar above said punch members and a lower cross bar below said die block said bars being substantially coplanar; means extending from said lower bar to each of said punch members to hold said punch members in a raised position when said reciprocable frame is in its upper position and downwardly movable to permit punching movement of said punch members as said frame is depressed; selector members on said upper cross bar each movable between an operative position in the plane of said cross bars and an angular inoperative position, each of said selector members when in an operative position adapted to cause punching movement of a corresponding punch member on depression of said frame; and a keyboard including a plurality of manually operated setting levers for shifting said selector members to their operative positions, and a plurality of clearing levers manually engageable to shift groups of said selector members to their inoperative positions.

12. A card notching machine, involving: a die block; a row of individually and freely movable punch members tending to fit into corresponding die apertures in said die block; a reciprocable frame including an upper cross bar above said punch members and a lower cross bar below said die block said bars being substantially coplanar; means extending from said lower bar to each of said punch members to hold said punch members in a raised position when said reciprocable frame is in its upper position and downwardly movable to permit punching movement of said punch members as said frame is depressed; selector members on said upper cross bar each movable between an operative position in the plane of said cross bars and an angular inoperative position, each of said selector members when in an operative position adapted to cause punching movement of a corresponding punch member on depression of said frame; a keyboard including a plurality of manually operated setting levers for shifting said selector members to their operative positions, and a plurality of clearing levers manually engageable to shift groups of said selector members to their inoperative positions; and a master clearing mechanism including a member engageable with all said selector members to shift said selector members to their inoperative positions.

13. A card notching machine, involving: a die block; a row of individually and freely movable punch members tending to fit into corresponding die apertures in said die block; a reciprocable frame including an upper cross bar above said punch members and a lower cross bar below said die block said bars being substantially coplanar; means extending from said lower bar to each of said punch members to hold said punch members in a raised position when said reciprocable frame is in its upper position and downwardly movable to permit punching movement of said punch members as said frame is depressed; selector members on said upper cross bar each movable between an operative position in the plane of said cross bars and an angular inoperative position, each of said selector members when in an operative position adapted to cause punching movement of a corresponding punch member on depression of said frame; a keyboard including a plurality of manually operated setting levers for shifting said seelctor members to their operative positions, a plurality of clearing levers manually engageable to shift groups of said selector members to their inoperative positions; a master clearing member operable to shift all of said selector members to render said first arms inoperative; an actuating means for said reciprocable frame; a device for operatively connecting said actuating means with said master clearing member to effect automatic clearing of said selector members; and manually operable means to render said device inoperative on said master clearing member.

References Cited in the file of this patent

UNITED STATES PATENTS

| | | |
|---|---|---|
| 782,263 | McCloud | Feb. 14, 1905 |
| 1,150,765 | Hoenack | Aug. 17, 1915 |
| 1,812,620 | Braitmayer | June 30, 1931 |
| 1,820,751 | Mansel | Aug. 25, 1931 |
| 2,035,777 | Welk | Mar. 31, 1936 |
| 2,062,155 | Welk et al. | Nov. 24, 1936 |
| 2,318,446 | Wolters | May 4, 1943 |
| 2,439,030 | Welk | Apr. 6, 1948 |